US011851982B2

(12) United States Patent
Fripp et al.

(10) Patent No.: US 11,851,982 B2
(45) Date of Patent: Dec. 26, 2023

(54) WELL TOOLS WITH COMPONENTS FORMED FROM PYROLYTICALLY DEGRADABLE MATERIALS

(71) Applicant: Halliburton Energy Services, Inc., Houston, TX (US)

(72) Inventors: Michael Linley Fripp, Carrollton, TX (US); Charles Timothy Smith, Edgewood, TX (US); Chad William Glaesman, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 169 days.

(21) Appl. No.: 17/228,171

(22) Filed: Apr. 12, 2021

(65) Prior Publication Data

US 2022/0325604 A1 Oct. 13, 2022

(51) Int. Cl.
*E21B 34/14* (2006.01)
*E21B 34/06* (2006.01)
*C09K 8/42* (2006.01)
*E21B 33/12* (2006.01)
*E21B 43/247* (2006.01)

(52) U.S. Cl.
CPC ............ *E21B 34/063* (2013.01); *C09K 8/426* (2013.01); *E21B 33/1208* (2013.01); *E21B 34/142* (2020.05); *E21B 43/247* (2013.01); *E21B 2200/08* (2020.05)

(58) Field of Classification Search
CPC ...... E21B 34/142; E21B 43/247; C09K 8/426
USPC ........................................................ 166/317
See application file for complete search history.

(56) References Cited

U.S. PATENT DOCUMENTS

| | | | |
|---|---|---|---|
| 2009/0255686 A1* | 10/2009 | Richard | E21B 43/086 166/205 |
| 2009/0283270 A1 | 11/2009 | Langeslag | |
| 2012/0067581 A1 | 3/2012 | Auzerais et al. | |
| 2014/0162910 A1* | 6/2014 | Braley | C09K 8/516 507/119 |
| 2015/0300131 A1 | 10/2015 | Vigderman et al. | |
| 2016/0201425 A1* | 7/2016 | Walton | E21B 33/1208 166/376 |
| 2016/0257786 A1 | 9/2016 | Fripp et al. | |
| 2016/0340995 A1 | 11/2016 | Walton et al. | |
| 2018/0230769 A1 | 8/2018 | Xu et al. | |
| 2019/0032173 A1 | 1/2019 | Sherman et al. | |

(Continued)

FOREIGN PATENT DOCUMENTS

| | | |
|---|---|---|
| WO | 2015163889 A1 | 10/2015 |
| WO | 2016007119 A1 | 1/2016 |

OTHER PUBLICATIONS

Polymer Properties Database, "Auto-Accelerated Oxidation of Plastics", 4 pages.

(Continued)

*Primary Examiner* — Zakiya W Bates
*Assistant Examiner* — Ashish K Varma
(74) *Attorney, Agent, or Firm* — Kilpatrick Townsend & Stockton LLP

(57) ABSTRACT

A well tool can include a body and at least one barrier element. The barrier element can include a pyrolytically degradable material that is positionable to block a flow of fluid across the body within a wellbore and to degrade by pyrolysis over time within the wellbore.

20 Claims, 7 Drawing Sheets

(56) References Cited

U.S. PATENT DOCUMENTS

2019/0078410 A1* 3/2019 Xu .......................... E21B 23/04
2019/0162050 A1* 5/2019 Fripp .................... C09K 8/508

OTHER PUBLICATIONS

Polymer Properties Database, "Ceiling Temperature and Depropagation", 3 pages.
Polymer Properties Database, "Thermal-Oxidative Degradation of Rubber", 3 pages.
European Patent Office, Search Report, BE202205118, dated Aug. 8, 2022, 12 pages.
PCT Application No. PCT/US2021/027031, International Search Report and Written Opinion, dated Dec. 21, 2021, 11 pages.
Office Action, BE 2002/6009, dated Jun. 8, 2023, 10 pages.

* cited by examiner

US 11,851,982 B2

WELL TOOLS WITH COMPONENTS FORMED FROM PYROLYTICALLY DEGRADABLE MATERIALS

TECHNICAL FIELD

The present disclosure relates generally to hydraulic fracturing operations and, more particularly (although not necessarily exclusively), to well tools that include degradable materials.

BACKGROUND

Downhole tools such as frac plugs, frac balls, and screens are used in hydraulic fracturing operations and oilfield applications. Frac plugs and frac balls use different mechanisms to block wellbore intervals within a wellbore. A screen can be included with a frac plug or frac ball to sift sand or mud coming across a body of a well tool. Downhole tools can get stuck downhole and it may be hard to retrieve them. The stuck components can block fluid flow and cause other downhole problems.

DETAILED DESCRIPTION

Figure 1:
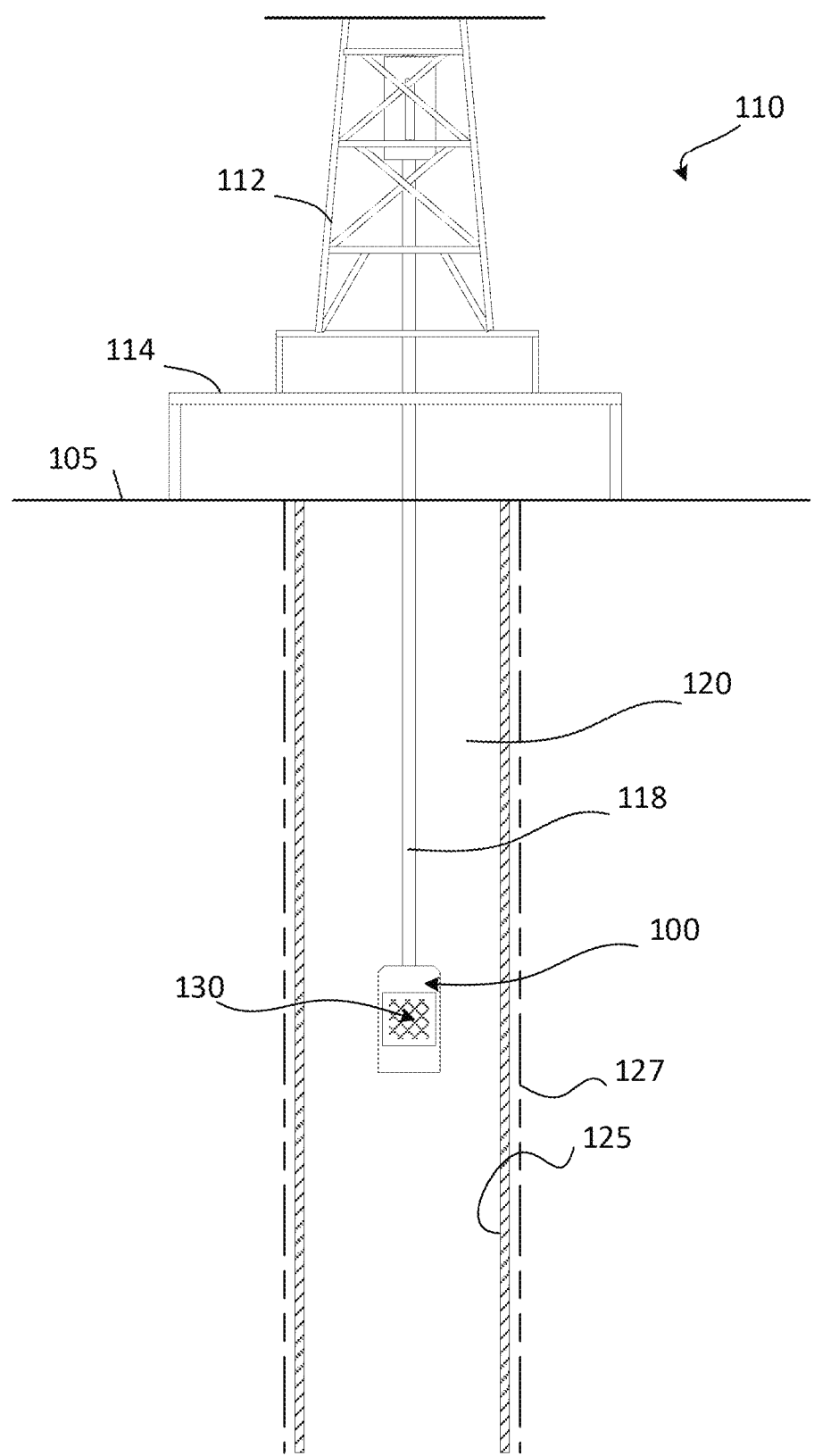
FIG. 1 is a cross-sectional view of a wellbore production environment with a well tool deployed within the wellbore according to one example of the present disclosure.

Certain aspects and examples of the present disclosure relate to deploying a well tool including a body and a barrier element made at least in part from a pyrolytically degradable material within a wellbore. A pyrolytically degradable material can include a polymer compound that can degrade by pyrolysis. Degradation by pyrolysis can be the thermal decomposition of materials at elevated temperatures in an inert atmosphere, which causes the polymer to lose at least a portion of its mass. In some cases, the degradation by pyrolysis may cause the polymer to lose other properties. The well tool can be maintained downhole in the wellbore for allowing at least a portion of the barrier element to degrade by pyrolysis. In some examples, the barrier element can be at least one frac plug, a frac ball, a basepipe plug, a sliding sleeve, or a screen for use in hydraulic fracturing operations. The barrier element of the well tool can be configured for blocking a flow of fluid across the body of the well tool during performing a downhole operation. The barrier element can be produced at least in part from the pyrolytically degradable material, and in some cases, the body of the well tool can also be made from a pyrolytically degradable material (e.g., the same pyrolytically degradable material as the barrier element or a different pyrolytically degradable material to the barrier element).

Some well tools for oilfield applications may use hydrolytically degradable materials or materials that required water or water-based for their degradation. But these well tools can fail to degrade in certain well conditions. For example, a well tool with a hydrolytically degradable material may not degrade in the presence of an oil-based fluid or foam. But pyrolytically degradable materials can degrade without the aid or addition of any liquids and without exposure to any particular liquid. For example, a pyrolytically degradable material can degrade without exposure to liquids that may flow downhole, such as oil, water, and treatment fluids. Some examples of well conditions in which a barrier element made from a pyrolytically degradable material can still pyrolytically degrade include the case when the well starts to produce oil too quickly or the case when fracturing is done with a foam. Additionally, examples of environments in which the pyrolytically degradable material can be configured to selectively degrade (or not degrade) can include environments with salinity, with salt, without salt, with water-based fluids, with oil-based fluids, with mud, or in air. The pyrolytically degradable material can degrade based solely on heat and time, irrespective of other external conditions.

In some examples, other structural components of the well tools can also be configured with pyrolytically degradable material. For example, a well tool can include a degradable support produced from the pyrolytically degradable material to aid the well tool. The degradable support can be kept in a temperature-resistant air chamber prior to the degradation by pyrolysis, which may prevent the onset of pyrolysis until a target objective is achieved.

A type of thermal breakdown of the pyrolytically degradable material can be an auto-oxidation. In some examples, a way to characterize thermal degradation of polymers is that the polymer can either become embrittled, through chain hardening and/or crosslinking, or softened, through chain scission. During auto-oxidation, the material can degrade when the chains break in a process of chain scission. The broken chains will continue to react and degrade the material, which can cause an internal, highly reactive, auto-accelerated process of degradation. Through such internal processes, the pyrolytically degradable material is not dependent on any type of fluids or other matter surrounding it.

Prior to a degradation by pyrolysis and during the performing of the downhole operation, the pyrolytically degradable material can be more susceptible to decomposing by a thermal-oxidative degradation. The thermal-oxidative exposure can set off the chain scission, which can cause the auto-accelerated degradation by pyrolysis. The pyrolytically degradable material can further undergo an additional internal process of crosslinking, which can be part of the auto-accelerated degradation by pyrolysis. Moreover, the additional process of crosslinking can accelerate the process of the degradation by pyrolysis. The combination of a polymer that is susceptible to chain scission and a crosslinker polymer that is susceptible to crosslinking may form the pyrolytically degradable material. The combined features of auto-accelerating a thermo-oxidative degradation and a softening of the polymer, subsequently causing the embrittlement and the failure of the polymer, can lead to an overall accelerated degradation process.

The auto-accelerated degradation by pyrolysis can occur with time and temperature. An overheating of the pyrolytically degradable material can cause thermal-oxidative degradation of the material to begin. Thermal degradation through chain scission can occur at temperatures much lower than temperatures where mechanical failure of the material is likely, which allows for operating the material at strength until the degradation starts to occur. During thermal degradation, the polymer can experience changes to its molecular weight, ductility, brittleness, strength, and cohesion. Chain scission can cause the backbone of the polymer to break and can reduce the polymer chain length. The reduced chain length can reduce the molecular weight, which can result in an embrittlement and failure of the polymer. In the pyrolytically degradable material, decreasing molecular weight as a result of degradation can correspond with decreasing strength, decreasing modulus, and further degradation, which can contribute to the auto-accelerated process of pyrolysis.

In addition to oxidation, chain scission, and crosslinking, other types of thermal breakdown of the pyrolytically degradable material can be depolymerization and side-group elimination, which can also occur with time and temperature. In depolymerization the ends of the polymer chains can break and, in the pyrolytically degradable material, these broken ends can form a free radical. Depolymerization can occur much more rapidly as the polymer approaches or exceeds its ceiling temperature, $T_c$. For example, a methyl-styrene polymer has a ceiling temperature of 66° C., an isobutylene polymer has a ceiling temperature of 175° C., and a methacrylate polymer has a ceiling temperature of 198° C., and depolymerization of the pyrolytically degradable material can occur at an increased rate for each polymer. Side-group elimination can cause groups that are attached to the side of the polymer backbone to break as the polymer is heated. In this case, degradation occurs from the formation and then breakage of double bonds. The side groups can be stripped off and the backbone can be scissioned. Side-group elimination can create peroxide or acids that may then allow the forming or breaking of double bonds. For example, PVC plastic can auto-generate hydrochloric acid (HCl) when heated above 100° C. Hydrogen removes a chlorine from the polymer molecule, forming HCl. The auto-generated HCl can cause de-chlorination of adjacent carbon atoms, which can then form their own double bonds. The auto-generated acid can also be used as a catalyst that can be used to attack the C—O ester bonds. The auto-generated acids can cause the formation of double bonds and act as catalysts for the breakage of double bonds, which can lead to degradation.

The pyrolytically degradable material can degrade by pyrolysis by various processes. Different polymer compositions can be selected for a particular type of pyrolytic degradation to occur. As an example, polybutadiene can undergo oxidative hardening and polyisoprene can undergo softening. In some examples, polymers with pendent bulky side groups can undergo softening through chain scission and hydrogen abstraction. In general, chain scission can dominate in elastomers with bulky or electron-donating side groups attached to a carbon atom adjacent to the double bond. Examples of such elastomers include polyisoprene IR, and isobutylene isoprene IIR. Polyolefins, polypropylene and polybutylene, with short alkyl side groups, can also undergo chain scission. Polypropylene and polyethylene can be susceptible to thermal degradation as the heat causes chain scission and the reduced chain length reduces the molecular weight, which can result in embrittlement and failure. In other examples, crosslinking can dominate in polybutadiene and its copolymers, such as polybutadiene BR, SBS, acrylonitrile butadiene NBR. Crosslinking can also dominate in polyethylene and polychloroprene. Some polymers, such as styrene butadiene SBR, polychloroprene CR, EPM, and EPDM, can undergo both chain scission and crosslinking. The polymer can be a blend of an elastomeric rubber and a plastic to form a thermoplastic elastomer (TPE) or a thermoplastic vulcinizate (TPV). The polymer compound selected for the pyrolytically degradable material can depend on the type of pyrolysis desired for the type of barrier element, the use of the barrier element, or the type of downhole operation.

In some examples, the pyrolytically degradable material can include a lower-temperature crosslinker and a higher-temperature crosslinker. The polymer can be crosslinked by heating the polymer to the lower temperature, which can first activate the lower-temperature crosslinker. After performing a downhole operation and during a period of maintaining the well tool downhole for a degradation by pyrolysis, the polymer can be engaged at a higher temperature, which can activate the higher-temperature crosslinker. The excess crosslinking may be provided at the higher temperature by a wellbore temperature. The excess crosslinking can serve as an activator that can accelerate the degradation of the polymer.

The pyrolytically degradable material may include additional ingredients for catalyzing the process of pyrolysis or a particular type of degradation by pyrolysis. For example, residual crosslinkers and accelerators can be used to accelerate thermal degradation. Similar to an auto-oxidation process, residual crosslinkers and accelerators can also undergo thermal decomposition and produce radicals that auto-accelerate the thermo-oxidative degradation of the polymer network. Accelerators can be an internal accelerator ingredient or external acceleration process. Examples of the crosslinker or residual crosslinker for a polymer compound include peroxide and hydroperoxide. The polymer compound can have excess peroxide that is more peroxide than is needed for an initial crosslinking. During a period of maintaining the well tool downhole for a degradation by pyrolysis, the compound can be cured quickly and then quenched, which can leave residual peroxide. Prior to the period of maintaining the well tool downhole for a degradation by pyrolysis, the polymer may be heated above an oxidation temperature. Then, the residual peroxide can digest the polymer and can induce accelerated degradation. Physical heating of the polymer or the residual crosslinker above the oxidation temperature may be an external process for accelerating the degradation by pyrolysis.

In some examples, catalyst ingredients can accelerate the auto-oxidation process and serve as catalysts for a hydroperoxide decomposition. Soluble fatty acid salts of metal ions such as copper (Cu), manganese (Mu), nickel (Ni), cobalt (Co), and iron (Fe) can act as catalysts for oxidation. These catalysts can accelerate the thermo-oxidative decomposition.

In some examples, the pyrolytically degradable material can be amorphous with low density and low crystallinity. For example, the pyrolytically degradable material can be a polymer that is free of minerals, oxides, antioxidants, and other stabilizers of the like. This is different from normal polymers, which seek high crystallinity and no branching to increase stability. With normal polymers, minerals and oxides are added to help stabilize the polymer and to prevent thermal degradation. Antioxidants, such as a sterically hindered phenol or organic phosphites, are also often added as scavengers for free radicals in normal polymers. But such minerals, oxides, and antioxidants may serve as stabilizers that inhibit the degradation by pyrolysis. So, a pyrolytically degradable polymers may minimize or eliminate such stabilizers to decrease stability for the purpose of enabling degradation.

In one example of the pyrolytically degradable material, the pyrolytic degradation of the polymer is an auto-accelerated process. During the auto-accelerated degradation by pyrolysis, excess chain reactions with free radicals can occur. Chain reactions can occur by the internal process of chain scission occurring in the polymer. The chain scission occurs during an initiation phase of the degradation by pyrolysis and can produce free chain radicals. During the auto-accelerated degradation by pyrolysis, the polymer can undergo the initiation phase and a propagation phase.

During the initiation phase, the initiation of the pyrolysis degradation can transition from a low rate of oxidation to a constant rate of oxidation. During the transition to a constant rate of oxidation, the scission that occurs in the C—C or C—H bonds can produce a highly reactive and unstable polymer, free chain radicals, R and an unpaired electron H. The polymer can contain trace amounts of initiator ingredients that can aid free radical production. Some examples of initiators include peroxides and hydroperoxides. For example, the concentration of the hydroperoxide can be generally very low at the beginning of the auto-oxidation process and, thus, the degradation process can be initially slow.

During the propagation phase of the auto-accelerated degradation by pyrolysis, the newly formed free chain radicals can react in an oxidation reaction to produce peroxy radicals, ROO. The peroxy radicals can be highly reactive and can react with the polymer chains to form more free radicals and more hydroperoxides, ROOH. The hydroperoxide can decompose to create more hydroxyl radicals and even more free chain radicals. As the hydroperoxide concentration increases, the degradation process increases.

The pyrolytically degradable material can be included in one or more barrier elements or other components of a well tool. The barrier elements can include a frac plug, basepipe plug, a frac ball, sliding sleeves, a screen plug, or a component thereof. Some examples of components of the frac plug that can include the pyrolytically degradable material are a mandrel, a wedge, a mule shoe, a ball seat, slips, an element, and a ball. Some examples of components of the sliding sleeves that can include the pyrolytically degradable material are a ball, a baffle, and the sliding sleeve. Some examples of components for the basepipe plug that can include the pyrolytically degradable material are inflow control devices (ICDs), autonomous inflow control devices (AICDs), screens, and a flow path between the inner diameter and the outer diameter of the tubing.

The barrier element can also have various elements that support the barrier element. The elements that support the barrier element can also be made from the pyrolytically degradable material. The elements that support the barrier element may be positioned in an air chamber to prevent the elements from degrading prematurely during the downhole operation.

In some examples, the pyrolytically degradable material can be combined with a hydrolytically degradable material in a degradable component. For example, a part of the barrier element can include a dissolvable PGA plastic that degrades with water exposure while another part of the barrier element can include a pyrolytically degradable material that can degrade through thermal-oxidative degradation. In some examples, a degradable compound formed from a combination of the pyrolytically degradable material and the hydrolytically degradable material may slowly degrade when exposed to water and then accelerate due to thermal-oxidative degradation.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional view of a well system 110 with a well tool 100 deployed within the wellbore 120 according to one example of the present disclosure. The surface of the well system 110 can include a derrick 112 with a rig floor 114, and the wellbore may be lined with casing 125 and be cemented into place with cement 127. The wellbore 120 may be an open-hole wellbore. The well tool 100 can be deployed downhole in the wellbore 120. Wellbore fluid can be introduced into the wellbore 120 via the well tool 100 downhole. The well tool 100 can block a flow of fluid across a body of the well tool 100 in the wellbore 120. The well tool 100 is a frac plug in this example, but other examples may involve other types of well tools.

A tool string 118 extends from the derrick 112 and the rig floor 114 downwardly into the wellbore 120. The tool string 118 may be any mechanical connection to the surface 105. Examples of mechanical connections of the tool string include a wireline, slickline, jointed pipe, or coiled tubing. The tool string 118 suspends the well tool 100 within the wellbore 120 for performing a downhole operation. In some cases, the well tool 100 is connected to the tool string 118 by a physical connection, or a connection using one or more components of the well tool 100 (e.g., slips, wedges, sealing element, and the like).

The well system 110 described herein is merely one example of a wide variety of well systems in which the principles of this disclosure can be utilized. The principles of this disclosure are not limited to any of the details of the well system 110, or components thereof, illustrated in the drawings or described herein. The well system 110 can include other components not illustrated in the drawing. For example, the wellbore 120 may not be of a vertical disposition and may be any of a vertical, horizontal, or deviated type. The well tool 100 may not be lowered into the wellbore 120 with a derrick and may be lowered with any suitable device. The well tool 100 may not be a single device, and the wellbore 120 may include several devices for blocking a flow of fluid across the bodies of well tools 100 within the wellbore 120.

In other examples of the present disclosure, the well tool 100 can include a frac ball, a ball on sleeve, a sliding sleeve, a basepipe plug, a packer, screen plug, an o-ring or other seal, a perf ball, or another barrier element. The well tool 100, regardless of a specific type of fluid-blocking device, comprises the body and the barrier element. The body and the barrier element may include the same material or different materials. For example, the body can include a rigid material to provide a rigidity and other mechanical aspects to the well tool 100. The barrier element can include an elastic material that is different from the rigid material and usable for blocking a flow of fluid across the body of the well tool 100 within the wellbore 120.

Figure 2:
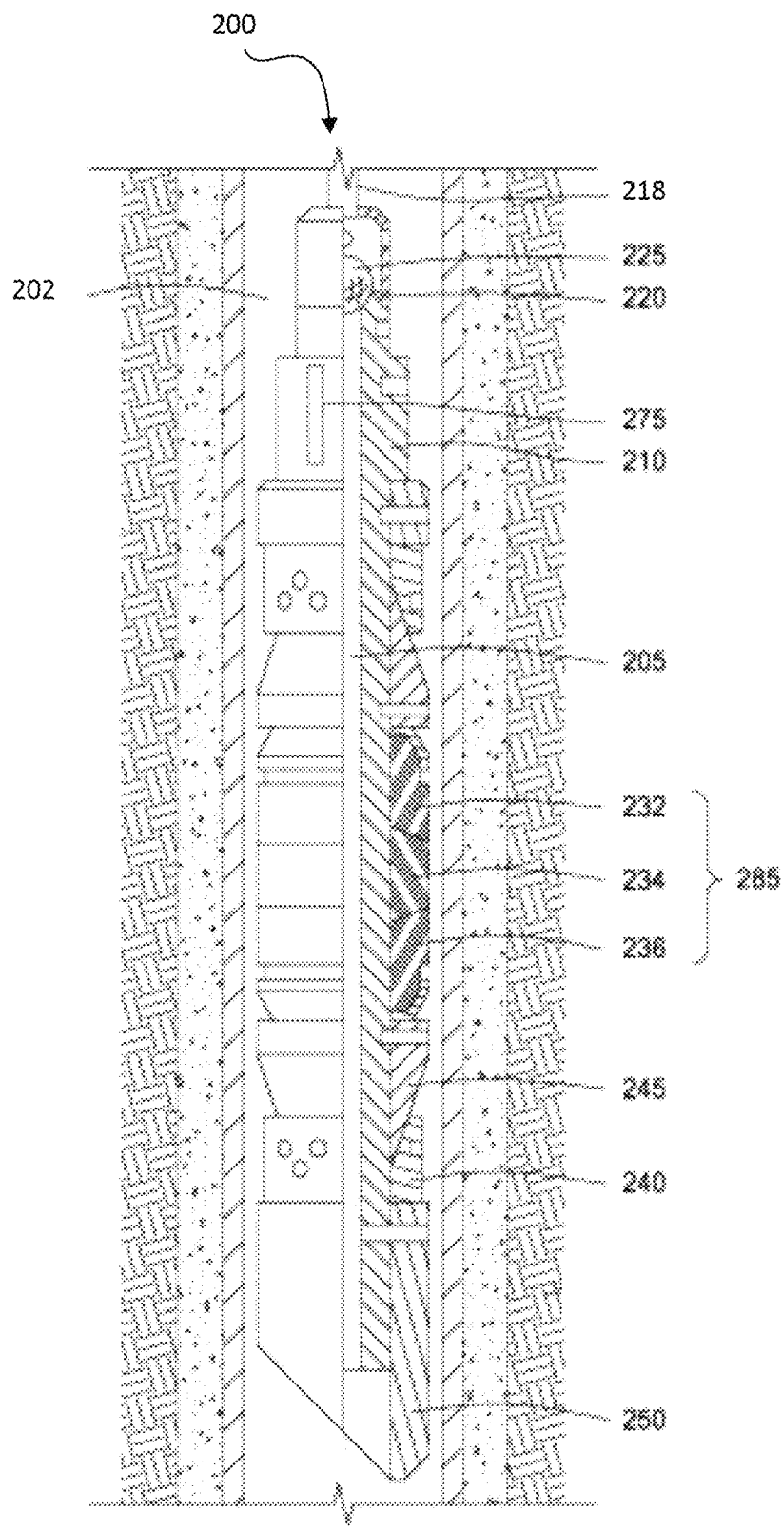
FIG. 2 is a cross-sectional view of an example of a well tool deployed within a wellbore according to one example of the present disclosure.
Figure 3:
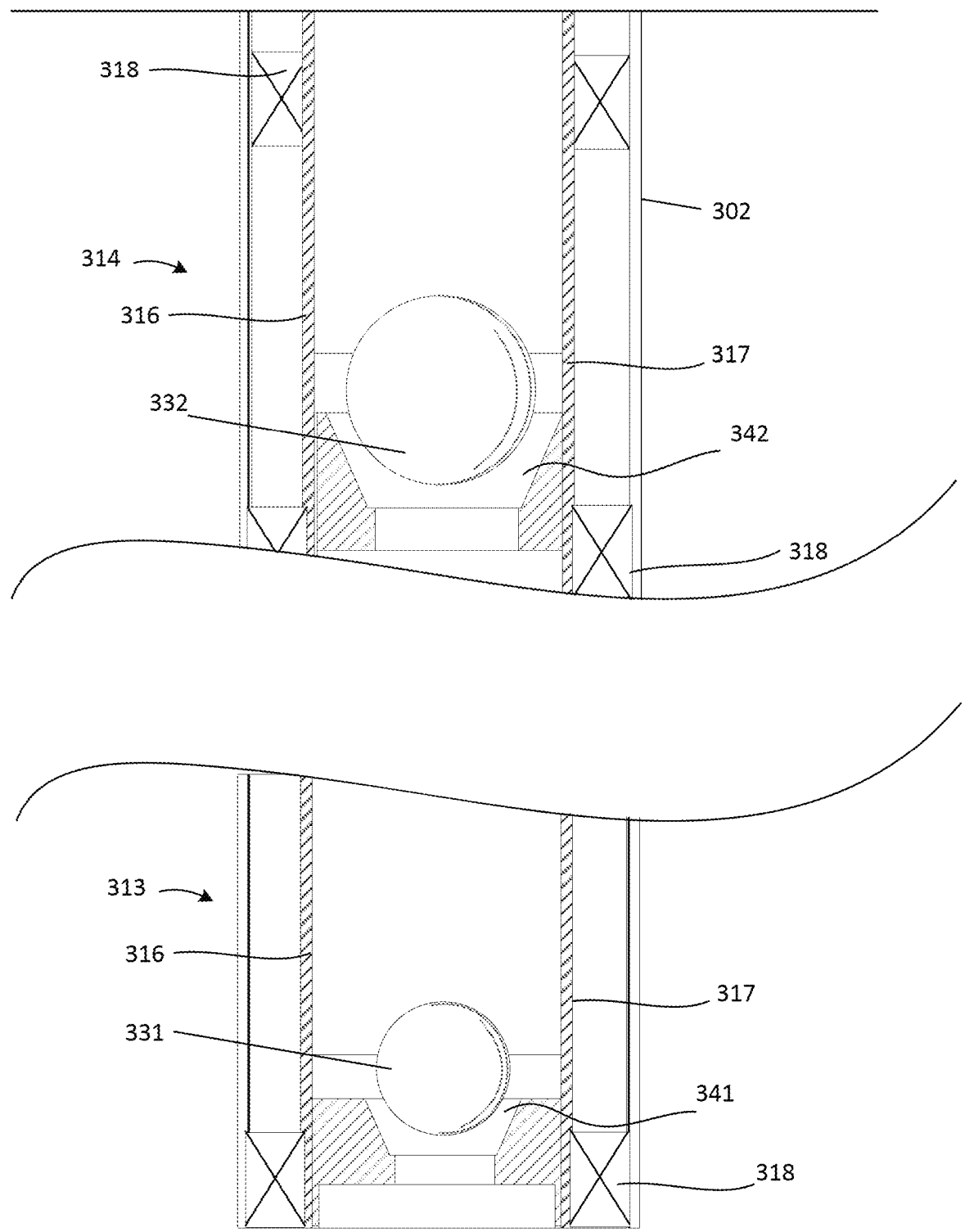
FIG. 3 is a cross-sectional view of another example of a well tool deployed within a wellbore according to one example of the present disclosure.
Figure 4:
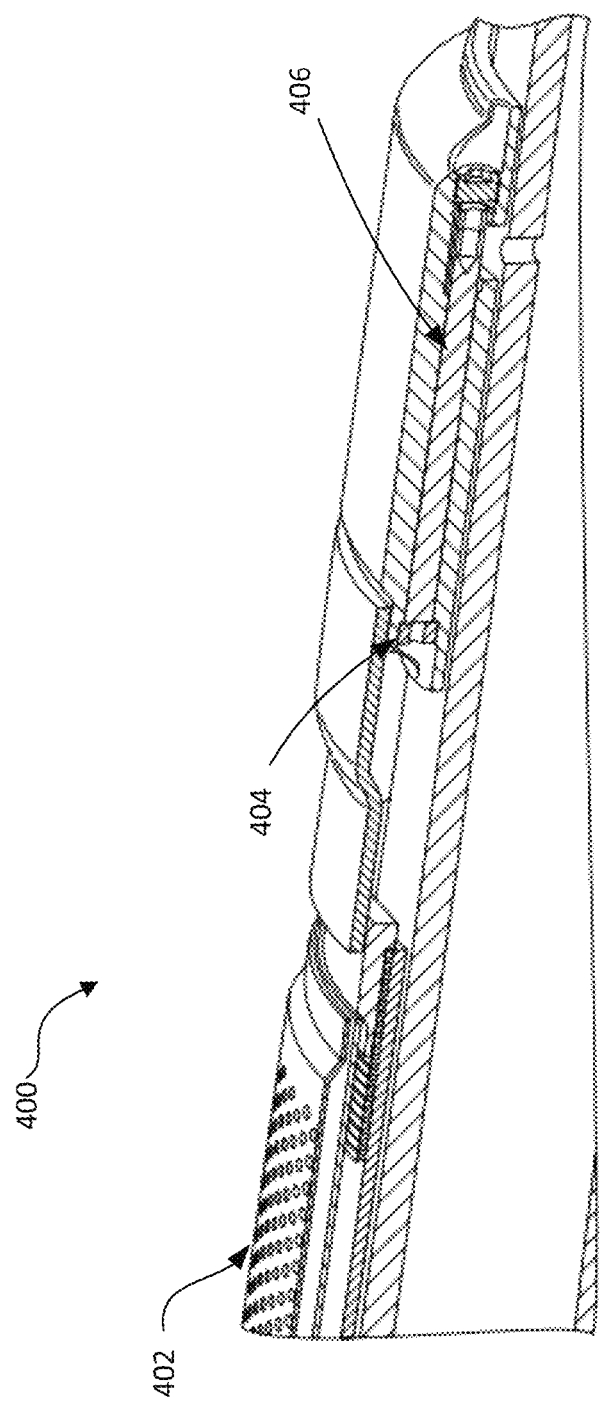
FIG. 4 is a cross-sectional view of another example of a well tool that includes a pyrolytically degradable material according to one example of the present disclosure.

In some examples, the barrier element or other parts of the well tool 100 can be made in part with a pyrolytically degradable material 130. Supports for the barrier element can also be made of the pyrolytically degradable material 130 and can be kept in an air chamber. The strength of the barrier element may depend on a number of factors including the material selected to form the barrier element, the operation to be performed by the well tool 100, the type of well tool 100, known well system 110 temperatures and wellbore 120 temperatures, and the like. The pyrolytically degradable material 130 can be configured to degrade to at least a portion of its original strength within a particular time range, such as a time period of 1 hour to 7 days. Any version of the barrier element and any component of the barrier element can be specifically configured to begin to pyrolytically degrade at least a portion of its mass in a target time range. FIGS. 2-4 describe other examples of a well tool and barrier element that can be made from the pyrolytically degradable material.

FIG. 2 is a cross-sectional view of a frac plug 200 being lowered into a wellbore 202 on a tool string 218 for use during a well stimulation or well fracturing operation. The frac plug may include a body 210 (including an axial flowbore 210 extending therethrough), a tapered shoe 250, a ball 225, cage 220, slips 240 and 245, and a blocking element 285. The frac plug may also include an optional enclosure 275. The blocking element 285 can include an upper blocking element 232, a center blocking element 234, and a lower blocking element 236, some or all of which may extend around the body 210. Other configurations may also be used for allowing the blocking element 285 to block a flow of fluid across the body within the wellbore 202. At least some parts of the frac plug 200 can be made from a pyrolytically degradable material. The rate of degradation by pyrolysis of the frac plug 200 can depend on the material selected to construct the frac plug 200, the use of the frac plug 200, and wellbore 202 temperature.

FIG. 3 is a cross-sectional view of an example of a well tool that includes a first frac ball 331 and a second frac ball 332 deployed within a wellbore 302. The well tool may include packers 318 external to the well tool, and the well tool may include ball seats 341, 342 and sleeves 316, 317. The first frac ball 331 can have a smaller outer diameter (OD) than the second frac ball 332, and the first ball seat 341 can have a smaller inner diameter (ID) than the second ball seat 342. The first frac ball 331 can engage the first ball seat 341 to temporarily restrict or prevent a fluid from flowing into any wellbore intervals located downhole of a first wellbore interval 313. To temporarily restrict or prevent fluid flow into wellbore intervals located downhole of a second wellbore interval 314, the second frac ball 332 can be dropped or flowed into the wellbore 302. The second frac ball 332 can be prevented from falling past the second ball seat 342 because the second frac ball 332 has a larger OD than the ID of the second ball seat 342. The second frac ball 332 can engage the second ball seat 342. In other examples, a frac ball (e.g., the first frac ball 331 or the second frac ball 332) may engage any other component suitable for allowing the frac balls 331, 332 to block a flow of fluid across the through the well tool. In some examples, at least some parts of the depicted well tool, such as the frac balls 331, 332, can be made from a pyrolytically degradable material. The rate of pyrolytic degradation of the frac balls 331, 332 can depend on the material selected to construct the frac balls 331, 332, the use of the frac balls 331, 332, and wellbore 302 temperature.

FIG. 4 is a cross-sectional view of another example of a well tool that includes a pyrolytically degradable material according to one example of the present disclosure. In this example, the well tool is a basepipe plug 400. The basepipe plug 400 may include a screen 402, a nozzle 404, and a plugging rod 406. Some of the parts of the basepipe plug 400, such as the screen 402, the nozzle 404, and the plugging rod 406 can be made from at least a portion of the pyrolytically degradable material. The rate of pyrolytic degradation of the basepipe plug 400 can depend on the material selected to construct the basepipe plug 400, the use of the basepipe plug 400, and wellbore temperature.

Figure 5:
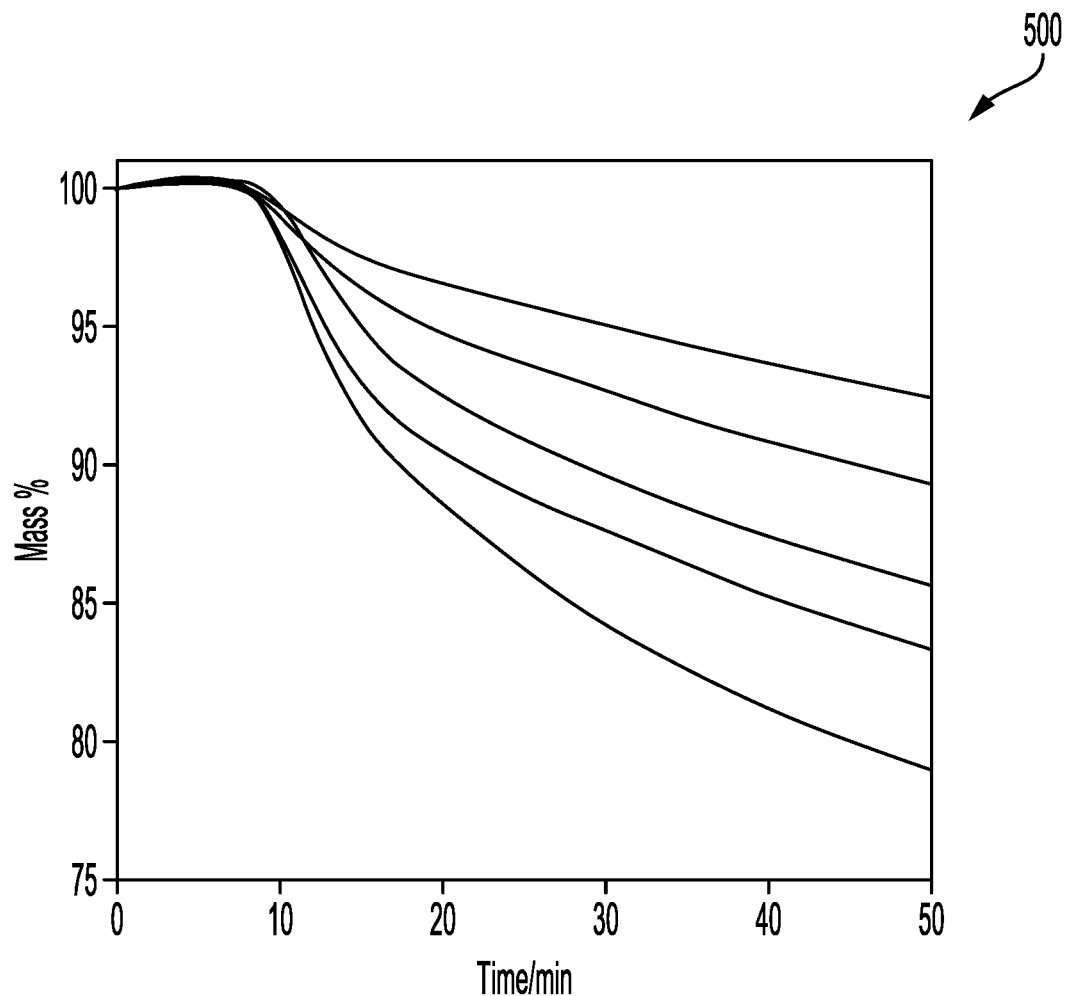
FIG. 5 is a graph illustrating the remaining mass of a pyrolytically degradable material as it degrades over a period of time according to one example of the present disclosure.

FIG. 5 is a graph 500 illustrating the change in mass of a pyrolytically degradable polymer over time according to some examples of the present disclosure. In particular, the graph 500 shows the rate over time at which a PVC film degrades to at least a portion of its mass for temperatures of 160° C., 170° C., 180° C., 190° C., and 200° C. (top to bottom). To create the PVC film, pure PVC was blended with a di-(2-ethylhexyl)phthalate (DEHP) plasticizer and extruded as a 0.3 mm thick film at 170° C. The PVC film can begin to reduce to at least a portion of its mass after at most 10 minutes, based on temperatures as low as 160° C. The graph 500 shows that at 50 minutes the PVC film polymer at 160° C. will lose approximately 5% of its starting mass and retain approximately 95% of its starting mass. The polymer can retain most of its original strength and form and its function may not be compromised during the performing a downhole operation. The polymer can withstand lower temperature wellbore conditions of around 160° C. where a downhole operation is performed; meanwhile, the polymer can continue to degrade slowly and constantly under the same wellbore conditions where the downhole operation is performed. The polymer may continue to react and degrade by pyrolysis during lower wellbore temperatures once an initiation phase of the degradation by pyrolysis has begun. In some examples, oxidation-based degradation can begin slowly or reach a constant rate and the rate of oxidation-based degradation can steadily increase over time.

Figure 6:
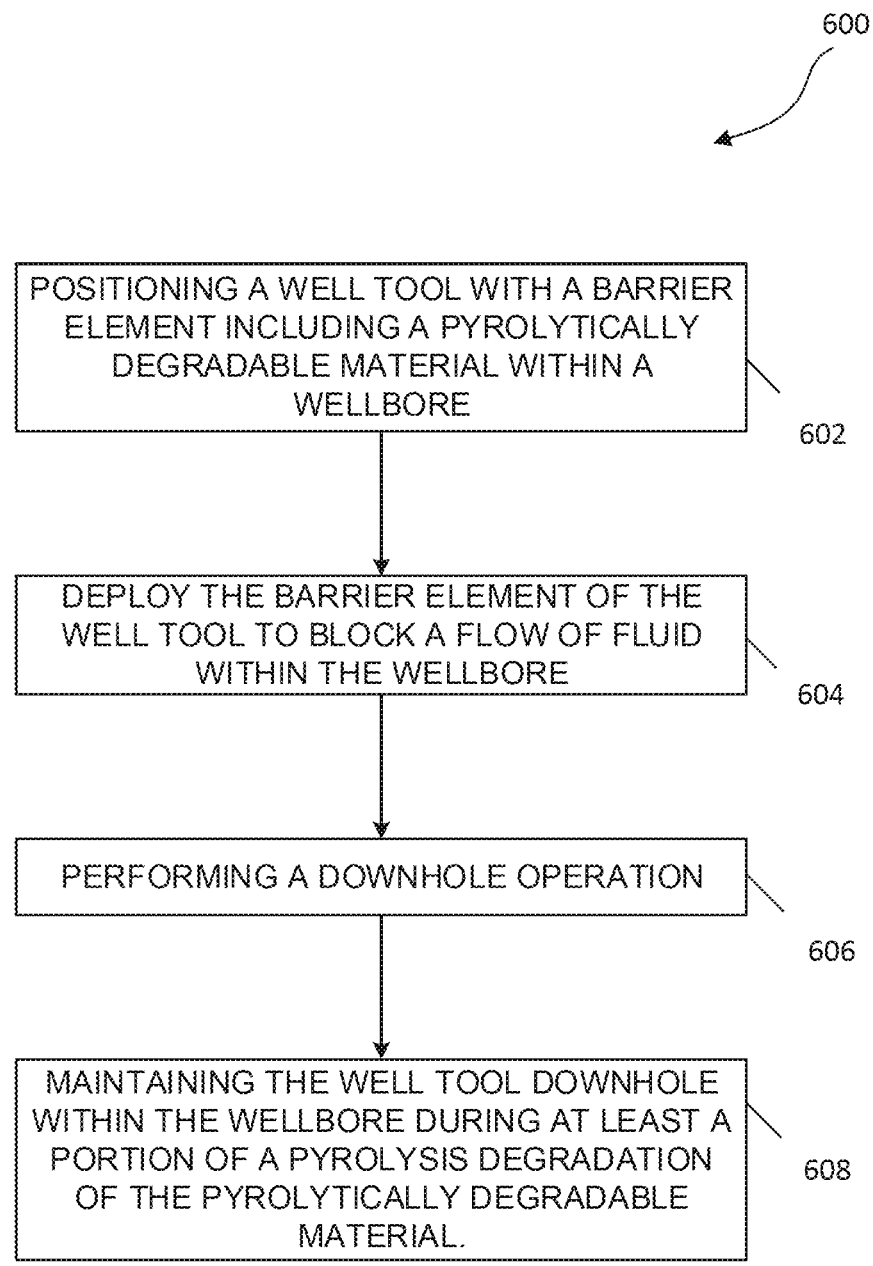
FIG. 6 is a flowchart of a process for deploying a barrier element including a pyrolytically degradable material within a wellbore according to one example of the present disclosure.

FIG. 6 is a flowchart of a process 600 for deploying an element including a pyrolytically degradable material within a wellbore according to one example of the present disclosure. Other examples may involve more operations, fewer operations, different operations, or a different order of the operations shown in FIG. 6.

At block 602, a well operator can position a well tool with a body and a barrier element including a pyrolytically degradable material downhole within a wellbore. In some cases, there may be more than one well tool or supports made of the pyrolytically degradable material positioned in the wellbore. Prior to positioning the well tool downhole, the part of the tool including the pyrolytically degradable material can be activated with a low-temperature crosslinker in preparation for a degradation by pyrolysis. Any pyrolytically degradable supports can be kept in an air chamber prior to positioning them with respect to the well tool within the wellbore.

At block 604, the operator can deploy the barrier element of the well tool to block a flow of fluid within the wellbore. This may include an operator transmitting a control signal to an electronic controller or a fluidic controller of the well tool for operating the barrier element of the well tool.

At block 606, the operator may perform a downhole operation with the well tool. The downhole operation performed may vary depending on the type of the barrier element and may include more than one operation. Examples of such downhole operations include any wellbore completion stage jobs, such as casing the wellbore or cementing the wellbore, or downhole repairs, such as casing repair.

At block 608, the operator may maintain the well tool downhole within the wellbore during at least a portion of a pyrolysis degradation of the pyrolytically degradable material. In some examples involving pyrolytically degradable supports, an operator may disarm an air chamber containing the pyrolytically degradable supports so that the supports become exposed to the environment in the wellbore for facilitating pyrolysis degradation.

Figure 7:
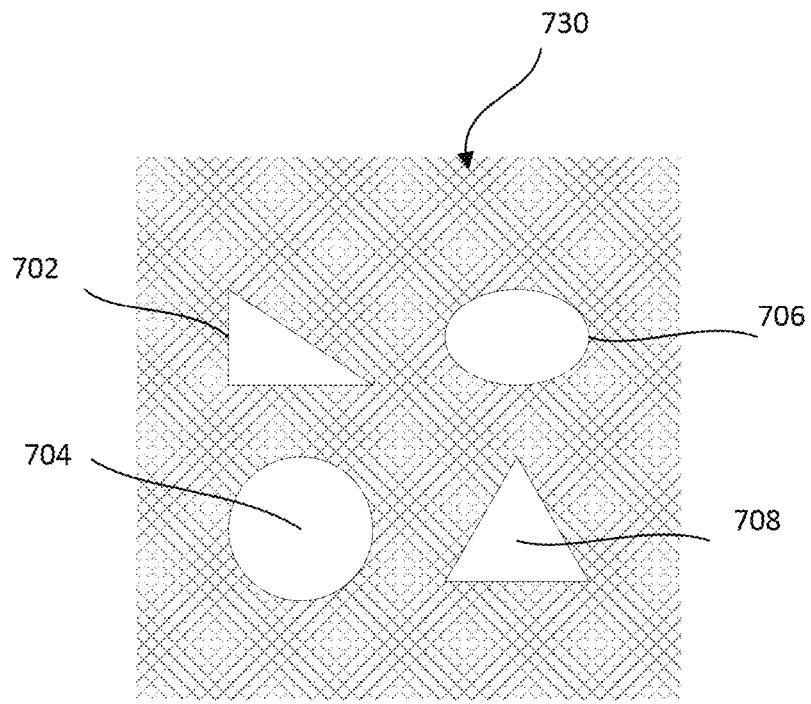
FIG. 7 is a diagram of a pyrolytically degradable material according to one example of the present disclosure.

FIG. 7 is a block diagram of a pyrolytically degradable material 730 that can include any combination of a number of ingredients, such as an initiator ingredient 702, a crosslinker polymer 704, a residual crosslinker 706, or any combination of these. The ingredients can be heated to produce a polymer compound, which can be used to create the pyrolytically degradable material 730. The combination of ingredients can be selected depending on the desired rate of overall degradation by pyrolysis, the type of pyrolysis to occur, or the temperature threshold that the combination of ingredients can endure for a degradation by pyrolysis. For example, the residual crosslinker 706 can be included in the pyrolytically degradable material 730. The residual crosslinker 706 may cause the strength of the pyrolytically degradable material 730 to decrease as an embrittlement of the polymer compound increases during an internal oxidative-hardening process or a crosslinking process, leading to failure of the pyrolytically degradable material 730 at an accelerated rate. Additional or alternative ingredients can be included with the pyrolytically degradable material 730 for auto-accelerating or catalyzing the process of pyrolysis and/or a particular type of degradation by pyrolysis.

In some aspects, a well tool, a method, and a system are provided according to one or more of the following examples. As used below, any reference to a series of examples is to be understood as a reference to each of those examples disjunctively (e.g., "Examples 1-4" is to be understood as "Examples 1, 2, 3, or 4")

Example 1 is a well tool that comprises a body and at least one barrier element. The at least one barrier element comprises a pyrolytically degradable material that is positionable to block a flow of fluid across the body within a wellbore and to degrade by pyrolysis over time within the wellbore.

Example 2 is the well tool of Example 1, wherein the pyrolytically degradable material is a compound, the compound further comprising an initiator ingredient that is positionable with respect to the pyrolytically degradable material for auto-accelerating an initiation phase of a pyrolysis degradation.

Example 3 is the well tool of Example 2, wherein the compound further comprises a crosslinker polymer or any of a plurality of copolymers of a crosslinker polymer, in excess of a minimum amount necessary for an internal process of crosslinking to occur, that is positionable with respect to the pyrolytically degradable material for increasing an embrittlement of the pyrolytically degradable material during the pyrolysis degradation.

Example 4 is the well tool of Example 3, wherein the compound further comprises at least one residual crosslinker and at least one accelerator that is positionable with respect to the pyrolytically degradable material for catalyzing the internal process of crosslinking in the pyrolysis degradation.

Example 5 is the well tool of Example 4, wherein the at least one residual crosslinker is peroxide or hydroperoxide and the at least one accelerator is a soluble fatty acid salt of a metal ion that is positionable with respect to the pyrolytically degradable material for accelerating oxidation in the pyrolysis degradation.

Example 6 is the well tool of Example 3, wherein the compound comprises a lower-temperature crosslinker and a higher-temperature crosslinker that is activated at a higher temperature higher relative to the lower-temperature crosslinker, wherein the lower-temperature crosslinker and the higher-temperature crosslinker are positionable with respect to the pyrolytically degradable material for accelerating the internal process of crosslinking in the pyrolysis degradation.

Example 7 is the well tool of any of Examples 1-6, wherein the barrier element is a frac plug, a frac ball, a ball on sleeve, a system of sliding sleeves, a basepipe screen plug, or a plurality of plugs comprising the pyrolytically degradable material.

Example 8 is the well tool of any of examples 1-7, wherein the barrier element further comprises a plurality of supports comprising the pyrolytically degradable material that are positionable within an air chamber to support the barrier element in blocking the flow of fluid across the body within the wellbore and to degrade by pyrolysis over time within the wellbore after at least a portion of the barrier element degrades by pyrolysis.

Example 9 is the well tool of any of Examples 1-8, wherein the pyrolytically degradable material is combined with a hydrolytically degradable material.

Example 10 is a method comprising: positioning a well tool in a wellbore, the well tool comprising a body and at least one barrier element comprising a pyrolytically degradable material that is positionable to block a flow of fluid across the body within the wellbore and to degrade by pyrolysis over time within the wellbore; deploying the barrier element of the well tool to block the flow of fluid across the body within the wellbore prior at a point in time relative to performing a downhole operation; and maintaining the well tool downhole within the wellbore during at least a portion of a pyrolysis degradation of the pyrolytically degradable material.

Example 11 is the method of Example 10, wherein the pyrolytically degradable material is a compound, the compound further comprising an initiator ingredient that is positionable with respect to the pyrolytically degradable material for auto-accelerating an initiation phase of a degradation by pyrolysis.

Example 12 is the method of Example 11, wherein the compound further comprises a crosslinker polymer or any of a plurality of copolymers of a crosslinker polymer, in excess of a minimum amount necessary for an internal process of crosslinking to occur, that is positionable with respect to the pyrolytically degradable material for increasing an embrittlement of the pyrolytically degradable material during the pyrolysis degradation.

Example 13 is the method of Example 12, wherein the compound further comprises at least one residual crosslinker and at least one accelerator that is positionable with respect to the pyrolytically degradable material for catalyzing the internal process of crosslinking in the pyrolysis degradation.

Example 14 is the method of Example 12, wherein the compound comprises a lower-temperature crosslinker and a higher-temperature crosslinker that is activated at a higher temperature relative to the lower-temperature crosslinker, wherein the lower-temperature crosslinker and the higher-temperature crosslinker are positionable with respect to the pyrolytically degradable material for accelerating the internal process of crosslinking in the pyrolysis degradation.

Example 15 is the method of any of Examples 10-14, wherein the barrier element is a frac plug, a frac ball, a ball on sleeve, a system of sliding sleeves, a basepipe screen plug, or a plurality of plugs in a screen comprising the pyrolytically degradable material.

Example 16 is a system comprising: a tool string positionable to extend from a surface of a well into a wellbore of the well; and a well tool positionable to couple to the tool string within the wellbore, the well tool comprising: a body, and at least one barrier element comprising a pyrolytically degradable material that is positionable to block a flow of fluid across the body within the wellbore and to degrade by pyrolysis over time within the wellbore.

Example 17 is the system of Example 16, wherein the pyrolytically degradable material is a compound, the compound further comprising an initiator ingredient that is positionable with respect to the pyrolytically degradable material for auto-accelerating an initiation phase of a pyrolysis degradation.

Example 18 is the system of Example 17, wherein the compound further comprises a crosslinker polymer or any of a plurality of copolymers of a crosslinker polymer, in excess of a minimum amount necessary for an internal process of crosslinking to occur, that is positionable with respect to the pyrolytically degradable material for increasing an embrittlement of the pyrolytically degradable material during the pyrolysis degradation.

Example 19 is the system of Example 18, wherein the compound further comprises at least one residual crosslinker and at least one accelerator that is positionable with respect to the pyrolytically degradable material for catalyzing the internal process of crosslinking in the pyrolysis degradation.

Example 20 is the system of Example 18, wherein the compound comprises a lower-temperature crosslinker and a higher-temperature crosslinker that is activatable at a higher temperature relative to the lower-temperature crosslinker, wherein the lower-temperature crosslinker and the higher-temperature crosslinker are positionable with respect to the pyrolytically degradable material for accelerating the internal process of crosslinking in the pyrolysis degradation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A well tool, comprising:
   a body; and
   at least one barrier element comprising a pyrolytically degradable material that is positionable to block a flow of fluid across the body within a wellbore and to degrade by pyrolysis degradation over time within the wellbore, the pyrolysis degradation comprising an initiation phase including chain scission that produces free radicals for auto-accelerating the pyrolysis degradation, wherein the pyrolytically degradable material is a compound, the compound further comprising an initiator ingredient that is positionable with respect to the pyrolytically degradable material for auto-accelerating the initiation phase of the pyrolysis degradation, and wherein the initiator ingredient is peroxide or hydroperoxide.

2. The well tool of claim 1, wherein the compound further comprises a crosslinker polymer or any of a plurality of copolymers of a crosslinker polymer, in excess of a minimum amount necessary for an internal process of crosslinking to occur, that is positionable with respect to the pyrolytically degradable material for increasing an embrittlement of the pyrolytically degradable material during the pyrolysis degradation.

3. The well tool of claim 2, wherein the compound further comprises at least one residual crosslinker and at least one accelerator that is positionable with respect to the pyrolytically degradable material for catalyzing the internal process of crosslinking in the pyrolysis degradation.

4. The well tool of claim 3, wherein the at least one residual crosslinker is peroxide or hydroperoxide and the at least one accelerator is a soluble fatty acid salt of a metal ion that is positionable with respect to the pyrolytically degradable material for accelerating oxidation in the pyrolysis degradation.

5. The well tool of claim 2, wherein the compound comprises a lower-temperature crosslinker and a higher-temperature crosslinker that is activated at a higher temperature higher relative to the lower-temperature crosslinker, wherein the lower-temperature crosslinker and the higher-temperature crosslinker are positionable with respect to the pyrolytically degradable material for accelerating the internal process of crosslinking in the pyrolysis degradation.

6. The well tool of claim 1, wherein the barrier element is a frac plug, a frac ball, a ball on sleeve, a system of sliding sleeves, a basepipe screen plug, or a plurality of plugs comprising the pyrolytically degradable material.

7. The well tool of claim 1, wherein the barrier element further comprises a plurality of supports comprising the pyrolytically degradable material that are positionable within an air chamber to support the barrier element in blocking the flow of fluid across the body within the wellbore and to degrade by pyrolysis over time within the wellbore after at least a portion of the barrier element degrades by pyrolysis.

8. The well tool of claim 1, wherein the pyrolysis degradation further comprises a propagation phase during which the free radicals react in an oxidation reaction to produce peroxy radicals that react with the pyrolytically degradable material to degrade the pyrolytically degradable material, and wherein the pyrolysis degradation is auto-accelerated during the propagation phase by the peroxy radicals reacting with the pyrolytically degradable material to increase a hydroperoxide concentration.

9. The well tool of claim 1, wherein the pyrolytically degradable material is configured to pyrolytically degrade at least a portion of mass of the pyrolytically degradable material in a target time range, and wherein a rate of the pyrolysis degradation depends on the pyrolytically degradable material, usage of the well tool, and a temperature of the wellbore.

10. A method, comprising:
   positioning a well tool in a wellbore, the well tool comprising a body and at least one barrier element comprising a pyrolytically degradable material that is positionable to block a flow of fluid across the body within the wellbore and to degrade by pyrolysis over time within the wellbore;
   deploying the barrier element of the well tool to block the flow of fluid across the body within the wellbore, the barrier element of the well tool blocking the flow of fluid during a downhole operation; and maintaining the well tool downhole within the wellbore during at least a portion of a pyrolysis degradation of the pyrolytically degradable material, the pyrolysis degradation comprising an initiation phase including chain scission that produces free radicals for auto-accelerating the pyrolysis degradation, wherein the pyrolytically degradable material is a compound, the compound further comprising an initiator ingredient that is positionable with respect to the pyrolytically degradable material for auto-accelerating the initiation phase of the pyrolysis degradation, and wherein the initiator ingredient is peroxide or hydroperoxide.

11. The method of claim 10, wherein the compound further comprises a crosslinker polymer or any of a plurality of copolymers of a crosslinker polymer, in excess of a minimum amount necessary for an internal process of crosslinking to occur, that is positionable with respect to the pyrolytically degradable material for increasing an embrittlement of the pyrolytically degradable material during the pyrolysis degradation.

12. The method of claim 11, wherein the compound further comprises at least one residual crosslinker and at least one accelerator that is positionable with respect to the pyrolytically degradable material for catalyzing the internal process of crosslinking in the pyrolysis degradation.

13. The method of claim 11, wherein the compound comprises a lower-temperature crosslinker and a higher-temperature crosslinker that is activated at a higher temperature relative to the lower-temperature crosslinker, wherein the lower-temperature crosslinker and the higher-temperature crosslinker are positionable with respect to the pyrolytically degradable material for accelerating the internal process of crosslinking in the pyrolysis degradation.

14. The method of claim 10, wherein the pyrolysis degradation further comprises a propagation phase during which the free radicals react in an oxidation reaction to produce peroxy radicals that react with the pyrolytically degradable material to degrade the pyrolytically degradable material, and wherein the pyrolysis degradation is auto-accelerated during the propagation phase by the peroxy radicals reacting with the pyrolytically degradable material to increase a hydroperoxide concentration.

15. The method of claim 10, wherein the pyrolytically degradable material is configured to pyrolytically degrade at least a portion of mass of the pyrolytically degradable material in a target time range, and wherein a rate of the pyrolysis degradation depends on the pyrolytically degradable material, usage of the well tool, and a temperature of the wellbore.

16. A system, comprising:
a tool string positionable to extend from a surface of a well into a wellbore of the well; and
a well tool positionable to couple to the tool string within the wellbore, the well tool comprising:
a body, and
at least one barrier element comprising a pyrolytically degradable material that is positionable to block a flow of fluid across the body within the wellbore and to degrade by pyrolysis degradation over time within the wellbore, the pyrolysis degradation comprising an initiation phase including chain scission that produces free radicals for auto-accelerating the pyrolysis degradation, wherein the pyrolytically degradable material is a compound, the compound further comprising an initiator ingredient that is positionable with respect to the pyrolytically degradable material for auto-accelerating the initiation phase of the Pyrolysis degradation, and wherein the initiator ingredient is peroxide or hydroperoxide.

17. The system of claim 16, wherein the compound further comprises a crosslinker polymer or any of a plurality of copolymers of a crosslinker polymer, in excess of a minimum amount necessary for an internal process of crosslinking to occur, that is positionable with respect to the pyrolytically degradable material for increasing an embrittlement of the pyrolytically degradable material during the pyrolysis degradation.

18. The system of claim 17, wherein the compound further comprises at least one residual crosslinker and at least one accelerator that is positionable with respect to the pyrolytically degradable material for catalyzing the internal process of crosslinking in the pyrolysis degradation.

19. The system of claim 17, wherein the compound comprises a lower-temperature crosslinker and a higher-temperature crosslinker that is activatable at a higher temperature relative to the lower-temperature crosslinker, wherein the lower-temperature crosslinker and the higher-temperature crosslinker are positionable with respect to the pyrolytically degradable material for accelerating the internal process of crosslinking in the pyrolysis degradation.

20. The system of claim 16, wherein the pyrolytically degradable material is configured to pyrolytically degrade at least a portion of mass of the pyrolytically degradable material in a target time range, and wherein a rate of the pyrolysis degradation depends on the pyrolytically degradable material, usage of the well tool, and a temperature of the wellbore.

* * * * *